Patented June 24, 1941

2,247,255

UNITED STATES PATENT OFFICE 2,247,255

PROCESS FOR IMPROVING THE STABILITY OF NITROPARAFFINS

Murray Senkus, Terre Haute, Ind., assignor to Commercial Solvents Corporation, Terre Haute, Ind., a corporation of Maryland No Drawing. Application February 12, 1940, Serial No. 318,630

15 Claims. (Cl. 202—57)

My invention relates to the heat stabilization of nitroparaffins, and more specifically to the stabilization of crude nitroparaffins against thermal decomposition under conditions encountered in the distillation of such nitroparaffins.

The nitroparaffins can be produced by the direct vapor phase nitration of paraffin hydrocarbons, as, for example, in accordance with the processes described in U. S. Patents 1,967,667 of H. B. Hass et al., 2,071,122 of H. B. Hass et al., 2,161,475 of G. K. Landon, and 2,164,774 of G. K. Landon. The crude nitroparaffins, obtained by such processes, are commonly purified by distillation, and in the case of nitration products from hydrocarbons containing more than one carbon atom, the mixed nitroparaffins obtained are separated by fractional distillation.

In attempting to distil the crude nitrated products at atmospheric pressure, thermal decomposition is encountered, and a colored distillate is obtained. This thermal decomposition appears to be accelerated by certain materials with which the nitrated products may be in contact. Thus, worse decomposition is encountered in stainless steel apparatus than in glass, and still worse in aluminum apparatus. This thermal decomposition can be reduced to some extent by preliminary steam distillation of the crude product, and can be further reduced by effecting the final distillation or fractionation under reduced pressure, and hence at a lower temperature. However, reduced pressure operation is more expensive, and requires larger apparatus for a given volume of material distilled, and is hence undesirable from a commercial standpoint.

The purified nitroparaffins obtained by fractional distillation are also subject to thermal decomposition, although to a considerably less degree than the crude nitroparaffins. Here, again, it is usually disadvantageous to have to resort to reduced pressure in an attempt to minimize the decomposition.

I have now discovered that the thermal stability of the nitroparaffins can be materially improved by incorporating therewith small amounts of certain inorganic acid compounds. The compounds which I have found to be effective for this purpose comprise sulfuric acid, sulfamic acid, the sulfonic acids, and phosphoric acid, the acid salts of said acids, the easily hydrolyzable amphoteric metal salts of said acids, and the easily hydrolyzable esters of said acids.

All of the inorganic acid compounds of the class described above are effective in improving substantially the thermal stability of the nitroparaffins. Although an improvement is effected in every case, it may not be sufficient to permanently prevent thermal decomposition, especially if the nitroparaffin is in contact with a metal which tends to accelerate decomposition reactions. Also, the various stabilizing agents of this class differ to some extent in the degree of their effectiveness. Thus, benzenesulfonic acid, 2-naphthol-6-sulfonic acid, aluminum sulfate and sodium bisulfate are sufficiently effective to enable steam-distilled crude nitroparaffins to be fractionally distilled over a distillation cycle of 120 hours in glass apparatus without any apparent thermal decomposition. On the other hand, sulfuric and phosphoric acids and zinc sulfate prevent thermal decomposition during atmospheric pressure distillation for somewhat shorter periods of time. These latter compounds, however, are effective over longer periods of time at somewhat reduced pressure, and in any case the utilization of one of these stabilizing agents will enable distillation to be carried out at higher pressure, i. e., at a higher temperature, without any thermal decomposition, than would be possible in the absence of such compounds.

The amount of stabilizing agent to be employed may vary over a considerable range, for example, from 0.01%–1.5%, based on the weight of the nitroparaffins. Smaller amounts may be effective in some cases, and considerably increased amounts may be employed in other cases without harmful effects. Excessive amounts of the mineral acids should be avoided, and I prefer to employ less than 0.07% by weight of phosphoric or sulfuric acid. Other acidic stabilizing agents, such as benzene-sulfonic acid, sulfamic acid, and sodium bisulfate may be employed in greater concentrations without danger of decomposition reactions. In any case the minimum amount of the inorganic acid compound for complete stabilization, under the conditions to be encountered, may of course be determined by preliminary experiments.

The stabilizing agent may simply be added to the nitroparaffins which are to be subjected to elevated temperatures. For simple batch distillation, the material may be added to the nitroparaffins in the distillation vessel, and for continuous distillation, the stabilizing agent may be added continuously to the feed. In the case of fractional distillation it is desirable that the liquid nitroparaffins in the fractionating column be in contact with the stabilizing agent, and to effect this end the stabilizing agent can be continuously added to the reflux entering the top of the column, as well as being introduced into the material in the kettle, or into the feed in a continuous fractionation.

The continuous introduction of the stabilizing agent can be carried out by any suitable mechanical means, liquid stabilizing agents such as benzenesulfonic acid may be directly introduced into the feed, or reflux, by means of suitable valve control, or a proportionating pump. Relatively insoluble solid stabilizing agents, such as aluminum sulfate, are most suitably employed in batch distillations, in which case the material is introduced into the kettle. Solid stabilizing agents of sufficient solubility may be continuously introduced by passing the feed or reflux through the solid material, the amount dissolved being controlled by the temperature of the liquid nitroparaffins being passed through the solid material. A wire mesh basket inserted in a suitable vessel in the reflux or feed lines will satisfactorily serve this purpose. Other equivalent means of introducing the stabilizing agents will of course be apparent to those skilled in the art.

My invention may further be illustrated by the following specific examples:

*Example I*

The crude nitroparaffins obtained by the nitration of propane were steam distilled, and the steam-distillate was separated by decantation. The oily layer, constituting the crude steam-distilled nitroparaffins, was charged into a glass distillation vessel equipped with a glass column packed with glass helices, the column approximating in efficiency a 20-plate bubble-cap column. Approximately 0.03% by weight of benzene sulfonic acid was added to the nitroparaffins, which were then fractionally distilled to separate low-boiling impurities, and to obtain as purified products nitromethane, nitroethane, 1-nitropropane and 2-nitropropane. The distillation required approximately 120 hours, and all of the cuts of the distillate were water-white, indicating no thermal decomposition.

In a similar distillation utilizing only 0.007% by weight of benzene sulfonic acid, the distillate became colored after 20 hours, and in a distillation effected without any stabilizing agent, the distillate became colored in approximately 15 hours.

*Example II*

Steam-distilled crude nitroparaffins were fractionally distilled as in Example I, in the presence of approximately 0.02% by weight of technical grade hydrated aluminum sulfate. A complete fractionation was obtained over a period of approximately 120 hours, without the appearance of any color in the distillate.

*Example III*

Steam-distilled crude nitroparaffins were fractionally distilled as in Example I, in the presence of approximately 0.35% by weight sodium bisulfate. A complete fractionation was obtained over a period of approximately 120 hours, without the appearance of any color in the distillate.

*Example IV*

Steam-distilled crude nitroparaffins were fractionally distilled as in Example I, in the presence of approximately 0.5% 2-naphthol-6-sulfonic acid. A complete fractionation was obtained over a period of approximately 120 hours, without the appearance of any color in the distillate.

It is to be understood, of course, that the above examples are merely illustrative and do not limit the scope of my invention. Although my invention has particular utility in the prevention of thermal decomposition during distillation of nitroparaffins, it is also applicable to other uses in which nitroparaffins are subjected to elevated temperatures. Likewise, my invention is not to be construed as limited to the particular stabilizing agent or nitroparaffins employed in the above examples. Any of the inorganic acid compounds of the class previously described may be utilized as stabilizing agents, and these agents may be employed to improve the thermal stability of any of the nitroparaffins. In general it may be said that the use of any equivalents or modifications of procedure, which would naturally occur to those skilled in the art, is included in the scope of my invention.

My invention now having been described, what I claim is:

1. A process for improving the thermal stability of nitroparaffins, which comprises incorporating therewith a small amount of an acid compound of the class consisting of sulfuric acid, sulfamic acid, the sulfonic acids, and phosphoric acid, the acid salts of said acids, the easily hydrolyzable amphoteric metal salts of said acids, and the easily hydrolyzable esters of said acids.

2. A process for improving the thermal stability of nitroparaffins, which comprises incorporating therewith a small amount of a sulfonic acid.

3. A process for improving the thermal stability of nitroparaffins, which comprises incorporating therewith a small amount of benzenesulfonic acid.

4. A process for improving the thermal stability of nitroparaffins, which comprises incorporating therewith an easily hydrolyzable sulfuric acid salt of an amphoteric metal.

5. A process for improving the thermal stability of nitroparaffins, which comprises incorporating therewith aluminum sulfate.

6. A process for improving the thermal stability of nitroparaffins, which comprises incorporating therewith an acidic salt of sulfuric acid.

7. A process for improving the thermal stability of nitroparaffins, which comprises incorporating therewith sodium bisulfate.

8. In a process for the purification of crude nitroparaffins, the step which comprises distilling said nitroparaffins while maintaining the heated liquid nitroparaffins in contact with a small amount of an acid compound of the class consisting of sulfuric acid, sulfamic acid, the sulfonic acids, and phosphoric acid, the acid salt of said acids, the easily hydrolyzable esters of said acids, and the easily hydrolyzable amphoteric metal salts of said acids.

9. In a process for the purification of crude nitroparaffins, the steps which comprise steam distilling said nitroparaffins and distilling the resulting steam-distilled nitroparaffins while maintaining the heated liquid nitroparaffins in contact with a small amount of an acid compound of the class consisting of sulfuric acid, sulfamic acid, the sulfonic acids, and phosphoric acid, the acid salts of said acids, the easily hydrolyzable amphoteric metal salts of said acids, and the easily hydrolyzable esters of said acids.

10. In a process for the purification of crude nitroparaffins, the steps which comprise steam distilling said nitroparaffins and distilling the resulting steam-distilled nitroparaffins while maintaining the heated liquid nitroparaffins in contact with a small amount of a sulfonic acid.

11. In a process for the purification of crude nitroparaffins, the steps which comprise steam distilling said nitroparaffins and distilling the resulting steam-distilled nitroparaffins while maintaining the heated liquid nitroparaffins in contact with a small amount of benzene-sulfonic acid.

12. In a process for the purification of crude nitroparaffins, the steps which comprise steam distilling said nitroparaffins and distilling the resulting steam-distilled nitroparaffins while maintaining the heated liquid nitroparaffins in contact with a small amount of an easily hydrolyzable sulfuric acid salt of an amphoteric metal.

13. In a process for the purification of crude nitroparaffins, the steps which comprise steam distilling said nitroparaffins and distilling the resulting steam-distilled nitroparaffins while maintaining the heated liquid nitroparaffins in contact with a small amount of aluminum sulfate.

14. In a process for the purification of crude nitroparaffins, the steps which comprise steam distilling said nitroparaffins and distilling the resulting steam-distilled nitroparaffins while maintaining the heated liquid nitroparaffins in contact with a small amount of an acid salt of sulfuric acid.

15. In a process for the purification of crude nitroparaffins, the steps which comprise steam distilling said nitroparaffins and distilling the resulting steam-distilled nitroparaffins while maintaining the heated liquid nitroparaffins in contact with a small amount of sodium bisulfate.

MURRAY SENKUS.